US012598211B2

(12) United States Patent
Cho et al.

(10) Patent No.: US 12,598,211 B2
(45) Date of Patent: Apr. 7, 2026

(54) CYBERATTACK SCORING METHOD, CYBERATTACK SCORING APPARATUS, AND COMPUTER READABLE STORAGE MEDIUM STORING INSTRUCTIONS TO PERFORM CYBERATTACK SCORING METHOD

(71) Applicant: AGENCY FOR DEFENSE DEVELOPMENT, Daejeon (KR)

(72) Inventors: Sungyoung Cho, Daejeon (KR); Yongwoo Park, Daejeon (KR); Geonho Lee, Daejeon (KR); Kyeongsik Lee, Daejeon (KR)

(73) Assignee: Agency For Defense Development, Daejeon (KR)

( * ) Notice: Subject to any disclaimer, the term of this patent is extended or adjusted under 35 U.S.C. 154(b) by 363 days.

(21) Appl. No.: 18/359,813

(22) Filed: Jul. 26, 2023

(65) Prior Publication Data

US 2024/0039953 A1      Feb. 1, 2024

(30) Foreign Application Priority Data

Jul. 27, 2022     (KR) ........................ 10-2022-0093497

(51) Int. Cl.
$H04L\ 9/40$              (2022.01)
(52) U.S. Cl.
CPC ...... H04L 63/1458 (2013.01); H04L 63/1416 (2013.01)
(58) Field of Classification Search
CPC ............. H04L 63/1458; H04L 63/1416; H04L 63/1433; G06F 21/55; G06F 21/577
(Continued)

(56) References Cited

U.S. PATENT DOCUMENTS 11,736,527 B1 * 8/2023 Joseph Durairaj .........................
                                                    H04L 63/1433
                                                        726/1
2023/0156017 A1 * 5/2023 Tyagi ..................... H04L 63/20
                                                        726/22
(Continued)

FOREIGN PATENT DOCUMENTS

CN          115037508 A  * 9/2022  ......... H04L 63/1433
KR          10-1781450 B1    9/2017
(Continued)

OTHER PUBLICATIONS

Office Action in Korean Application No. 10-2022-0093497 dated Jun. 12, 2024 and English translation.

*Primary Examiner* — Aubrey H Wyszynski
(74) *Attorney, Agent, or Firm* — Knobbe, Martens, Olson & Bear, LLP

(57)                ABSTRACT

Proposed is a cyberattack scoring method performed by a cyberattack scoring device including a memory storing one or more instructions and a processor executing the one or more instructions stored in the memory. The method may include determining a tactic for each of unit attacks included in a cyberattack based on an Adversarial Tactics, Techniques, and Common Knowledge (ATT&CK) framework. The method may also include determining a score for each of the unit attacks by calculating a weighted sum on attributes depending on the determined tactic according to priorities. The method may further include determining the score of the cyberattack by summing the determined scores of the unit attacks.

19 Claims, 6 Drawing Sheets

(58) Field of Classification Search
USPC ........................................................ 726/22
See application file for complete search history.

(56) References Cited

U.S. PATENT DOCUMENTS

| 2023/0205888 A1* | 6/2023 | Tyagi | .................... | G06F 21/577 |
| | | | | 726/26 |
| 2023/0336575 A1* | 10/2023 | Ackerman | .......... | H04L 63/1425 |

FOREIGN PATENT DOCUMENTS

| KR | 10-2240514 B1 | 4/2021 |
| KR | 10-2021-0089327 A | 7/2021 |

* cited by examiner

*FIG.2*

| Tactics | Tactic | Platform | Permission Required | Effective Permission | Data Sources | Supports Remote | Defense Bypassed | CAPEC Severity | Procdure Examples | Total Number of factors considered |
|---|---|---|---|---|---|---|---|---|---|---|
| Reconnaissance | x | x | x | x | o | x | x | If exists | o | 3 |
| Resource Development | x | x | x | x | o | x | x | If exists | o | 3 |
| Initial Access | o | o | o | x | o | x | x | If exists | o | 6 |
| Exeoution | o | o | o | x | o | o | x | If exists | o | 7 |
| Persistence | o | o | o | x | o | x | x | If exists | o | 6 |
| Privilege Escalation | o | o | o | o | o | x | x | If exists | o | 7 |
| Defense Evasion | o | o | o | x | o | x | o | If exists | o | 7 |
| Credential Access | o | o | o | x | o | x | x | If exists | o | 6 |
| Discovery | o | o | o | x | o | x | x | If exists | o | 6 |
| Lateral Movement | o | o | o | x | o | x | o | If exists | o | 7 |
| Collection | o | o | o | x | o | x | x | If exists | o | 6 |
| Command and Control | o | x | o | x | o | x | x | If exists | o | 6 |
| Exfiltration | x | x | o | x | o | x | x | If exists | o | 5 |
| Impact | x | x | o | x | o | x | x | If exists | o | 5 |

FIG.5

| Value | Quantification Value |
|---|---|
| SYSTEM | 5 |
| root | 5 |
| Administrator | 3 |
| User | 1 |

*FIG.6*

| Value | Quantification Value |
|---|---|
| Very High | 5 |
| High | 4 |
| Medium | 3 |
| Low | 2 |
| Very Low | 1 |
| None | 0 |

CYBERATTACK SCORING METHOD, CYBERATTACK SCORING APPARATUS, AND COMPUTER READABLE STORAGE MEDIUM STORING INSTRUCTIONS TO PERFORM CYBERATTACK SCORING METHOD

CROSS-REFERENCE TO RELATED APPLICATION

This application claims priority to Korean Patent Application No. 10-2022-0093497 filed on Jul. 27, 2022. The entire contents of the application on which the priority is based are incorporated herein by reference.

BACKGROUND

Technical Field

The present disclosure relates to a cyberattack scoring apparatus and method for detecting and coping with cyberattacks.

Description of the Technology

Cyberattacks such as targeted attacks or advanced persistent threat (APT) attacks are conducted to achieve an ultimate attack goal, such as stealing secrets or destroying the integrity or availability of data and systems under the auspices of a country or organization. In this process, attackers are presumed to perform cyberattacks for several months or years in the form of operations consisting of various attack steps using various attack methods.

SUMMARY

An object of the present disclosure is to provide a cyberattack scoring apparatus and method for acquiring the score of the cyberattack by weighting attributes dependent on tactics according to priorities.

However, the object of the present disclosure is not limited to that mentioned above, and another object not mentioned can be clearly understood by those skilled in the art from the description below.

In accordance with an aspect of the present disclosure, there is provided a cyberattack scoring method performed by a cyberattack scoring device including a memory storing one or more instructions; and a processor executing the one or more instructions stored in the memory, the method comprises: determining a tactic for each of unit attacks included in a cyberattack based on an Adversarial Tactics, Techniques, and Common Knowledge (ATT&CK) framework; determining a score for each of the unit attacks by calculating weighted sum on attributes depending on the determined tactic according to priorities; and determining the score of the cyberattack by summing the determined scores of the unit attacks.

In addition, the determining the score for each of the unit attacks may include determining the score of the unit attack based on the number of determined tactics of the unit attack included in a predetermined first interest tactic group.

In addition, the determining the score for each of the unit attacks may include determining the score of a unit attack based on the number of attack target platforms of the unit attack included in a predetermined second interest tactic group.

In addition, the determining the score for each of the unit attacks may include determining the score of a unit attack based on a required permission level of the unit attack included in a predetermined third interest tactic group.

In addition, the determining the score for each of the unit attacks may include determining the score of a unit attack based on an effective permission level according to the execution of the unit attack included in a predetermined fourth interest tactic group.

In addition, the determining the score for each of the unit attacks may include determining the score of a unit attack based on a type of data sources for the unit attack and the number of data components included in the unit attacks.

In addition, the determining the score for each of the unit attacks may include determining the score of a unit attack based on whether or not the unit attack included in a predetermined fifth interest tactic group is remotely controlled.

In addition, the determining the score for each of the unit attacks may include determining the score of a unit attack based on a target type and number of defense bypassed schemes of the unit attack included in a predetermined sixth interest tactic group.

In addition, the determining the score for each of the unit attacks may include determining the score of a unit attack based on a typical severity level matching the unit attacks.

In addition, the determining the score for each of the unit attacks may include determining the score of a unit attack based on the number of procedure examples of a unit technique included in the unit attack.

In addition, the determining the score for each of the unit attacks may include determining a weight used for the weighted sum according to the priority including a first-priority tactic including exfiltration and impact, a second-priority tactic including lateral movement, credential access, and collection, a third-priority tactic including persistence and privilege escalation, a fourth-priority tactic including execution, defense evasion, discovery, and command and control, a fifth-priority rank tactic including initial access, and a sixth-priority tactic including reconnaissance and resource development.

In accordance with another aspect of the present disclosure, there is provided a terminal control apparatus, the apparatus comprises: a memory storing one or more instructions; and a processor executing the one or more instructions stored in the memory, wherein the instructions, when executed by the processor, cause the processor to determine a tactic for each of unit attacks included in the cyberattack based on an Adversarial Tactics, Techniques, and Common Knowledge (ATT&CK) framework, determine a score for each of the unit attacks by calculating weighted sum on attributes depending on the determined tactic in order of priority, and determine the score of the cyberattack by summing the determined scores of the unit attacks.

In accordance with another aspect of the present disclosure, there is provided a non-transitory computer-readable recording medium storing a computer program, which comprises instructions for a processor to perform a cyberattack scoring method, the method comprises: determining a tactic for each of unit attacks included in a cyberattack based on an Adversarial Tactics, Techniques, and Common Knowledge (ATT&CK) framework; determining a score for each of the unit attacks by calculating a weighted sum on attributes depending on the determined tactic according to priorities; and determining the score of the cyberattack by summing the determined scores of the unit attacks.

According to an embodiment of the present disclosure, it is possible to easily determine the urgency and/or importance of a cyberattack by scoring and quantifying the cyberattack. This makes it possible to set response priorities for the cyberattacks and appropriately respond to the cyberattacks according to the set priorities.

BRIEF DESCRIPTION OF THE DRAWINGS

FIG. 2 is a diagram illustrating an attribute information table for an attack scheme stored in advance by the cyberattack scoring apparatus according to the embodiment of the present disclosure.

FIG. 5 is a diagram illustrating a quantitative value conversion table according to authority used in a method of acquiring the score of the unit attack according to an embodiment in the cyberattack scoring method according to the embodiment of the present disclosure.

FIG. 6 is a diagram illustrating a quantitative value conversion table according to a severity level used in a method of acquiring a score of a unit attack according to an embodiment in a cyberattack scoring method according to another embodiment of the present disclosure.

DETAILED DESCRIPTION

Figure 1:
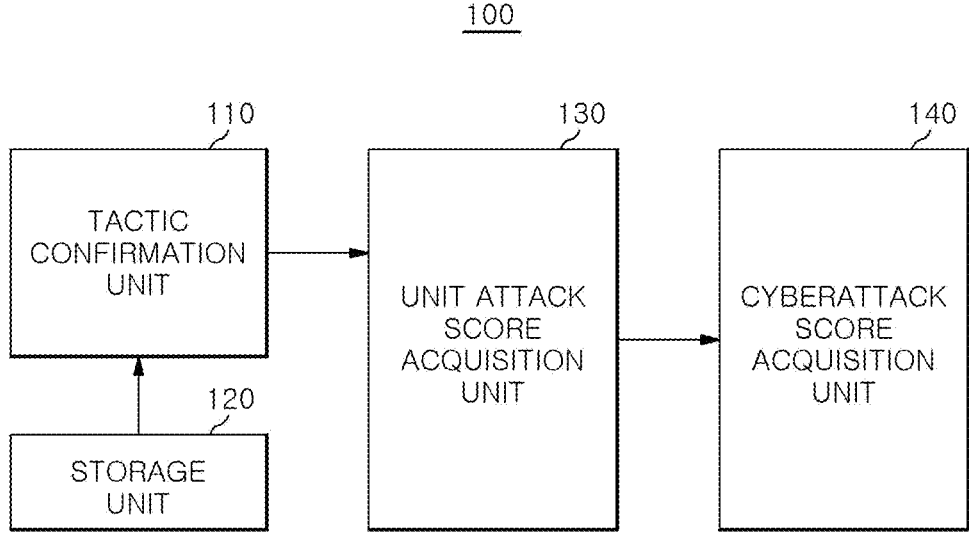
FIG. 1 is a control block diagram of a cyberattack scoring apparatus according to an embodiment of the present disclosure.

As one of efforts to effectively detect and cope with cyberattacks, an ATT&CK (Adversarial Tactics, Techniques, and Common Knowledge) framework announced by MITRE is positioned, in fact, as a standard model that can explain tactics, techniques, and procedures (TTPs) of a cyberattack. Recently, several attempts have been made to effectively detect and cope with cyberattacks using an ATT&CK framework, and among these, research on a scheme for scoring APT attacks is also being actively conducted.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted to clearly describe the present disclosure.

FIG. 1 is a control block diagram of a cyberattack scoring apparatus according to an embodiment of the present disclosure, and FIG. 2 is a diagram illustrating an attribute information table for an attack scheme stored in advance by the cyberattack scoring apparatus according to the embodiment of the present disclosure.

The cyberattack scoring apparatus of the present disclosure refers to any device that scores and quantifies cyberattacks to effectively detect and cope with the cyberattacks.

One method of detecting cyberattacks is to score tactics. Specifically, a greatest value among severity levels of attack techniques for each of seven steps of Lockheed Martin's cyber kill chain that is a representative model describing APT attacks, that is, reconnaissance, weaponization, delivery, exploitation, installation, command and control, and actions on objectives can be assigned. For each attack technique, an attack technique defined in MITRE ATT&CK may be used, and for the severity of each attack technique, typical severity defined in an attack pattern of the related CAPEC (Common Attack Pattern Enumeration and Classification) may be used. However, the severity level tailored to the goal of the analyst depending on the situation may be used, and a weight tailored to the analyst may be calculated by reflecting the relative importance of each step. The severity level of each attack technique may be converted from a qualitative level to a quantitative range as illustrated in Table 1, a score of the APT attack may be calculated using a value thereof according to the following equation, and an APT attack may be detected when the value is equal to or greater than a threshold ($\tau$).

TABLE 1

| Qualitative level | Quantitative range | Rounded average value |
|---|---|---|
| Low | 0.1-3.9 | 2.0 |
| Medium | 4.0-6.9 | 6.0 |
| High | 7.0-8.9 | 8.0 |
| Critical | 9.0-10.0 | 10.0 |

Here, η may represent all stages (7 stages) constituting an APT attack, and $w_i$ and $S_i$ may represent the weight and maximum severity in each attack stage.

Alternatively, a provenance graph can be derived using an alert generated from a commercial endpoint detection and response (EDR) product and named a tactical provenance graph (TPG). In this process, each alert may be mapped to an attack technique of MITRE ATT&CK, and scored using information on the typical severity and likelihood of the attack of a CAPEC attack pattern associated with the attack technique of the ATT&CK. The typical severity and the likelihood of the attack may have 5 values (very low, low, medium, high, and very high), which can be converted into scores in a range of [1, 5]. When there is no associated CAPEC attack pattern among ATT&CK attack techniques, or when there is no value of typical severity or the likelihood of the attack among the CAPEC attack patterns, normalization may be performed within a range of 15 levels using a severity score assigned by an EDR manufacturer. In this case, the severity of each attack technique using the CAPEC attack pattern can be calculated according to Equation 1.

$$TS(\text{technique})=2\times\text{score}_{severity}+\text{score}_{likelihood} \qquad \text{Equation 1}$$

When the TPG is generated using an alert generated by detection in EDR, a score of the TPG, that is, the entire threat can be calculated for the longest path (Y) among several paths constituting the TPG according to the following equation. The final score is a value obtained by multiplying all the severities of attack techniques corresponding to all alerts on the longest path among TPGs and is illustrated in Equation 2.

$$TS(TPG) = \max_{T^i \in Y} \prod_{T^i_j \in T^i} TS\left(T^i_j\right) \qquad \text{Equation 2}$$

As another method, when a user-defined risk level (risk Level) and an associated ATT&CK attack technique are present in a rule for detecting or identifying the attack, the risk of the rule can be calculated according to Equation 3 using typical severity and a likelihood of the attack defined in an attack pattern of the CAPEC associated with the attack technique calculate a priority of the attack. In this case, a and p can be adjusted to a value between [0, 1].

$$t_{RISK}=\beta\times(\alpha\times\text{score}_{likelihood}(1-\alpha)\times\text{score}_{severity})+(1-\beta)\times \text{score}_{custom} \qquad \text{Equation 3}$$

However, the problems with the scoring method described above are as follows. First, all commonly referenced attack patterns of CAPEC do not have values for the typical severity and the likelihood of the attack.

Second, CAPEC related to all attack techniques defined in the ATT&CK framework may not be present. Further, since CAPEC does not have all of the typical severity or the likelihood of the attack, a user (analyst) assigns a value to a null value of the typical severity or the likelihood of the attack.

Third, when the analyst scores a null value or a user-defined value, the score is subjectively determined according to the analyst's personal bias, and thus, scores by different analysts cannot be compared with each other.

To solve this problem, the cyberattack scoring apparatus 100 according to the embodiment of the present disclosure proposes a scoring method in which information included in the ATT&CK framework without subjective attributes is fully utilized. Hereinafter, a configuration of the cyberattack scoring apparatus 100 according to the embodiment of the present disclosure will be described.

Referring to FIG. 1, the cyberattack scoring apparatus 100 according to the embodiment of the present disclosure includes a tactic confirmation unit 110, a storage unit 120, a unit attack score acquisition unit 130, and a cyberattack score acquisition unit 140.

The tactic confirmation unit 110 may confirm a tactic to which each of the unit attacks constituting the cyberattack belongs. To this end, the tactic confirmation unit 110 may use the ATT&CK framework. In this case, the ATT&CK framework may have a table such as Table 2 that includes attribute information for describing and classifying each attack technique.

TABLE 2

| Field | Description |
| --- | --- |
| Name | The name of (sub-)technique |
| ID | Unique Identifier for the (sub-)technique |
| Tactic | The tactic objectives that the (sub-)technique can be used to accomplish |
| Description | Information about the (sub-)technique |
| Platform | The system an adversary is operating within |
| System Requirements | Additional information on requirements the adversary needs to meet or about the state of the system that may be required for the (sub-)technique to work |
| Network Requirements | Whether the network connection is required for the (sub-)technique to work |
| Permission Required | The lowest level of permissions the adversary is required to be operating within to perform the (sub-)technique on a system |
| Effective Permissions | The level of permissions the adversary will attain by performing the (sub-)technique |
| Data Sources | Source of information collected by a sensor or logging system that may be used to collect information relevant to identifying the acting being performed, the sequence of actions, or the results of those actions by an adversary |
| Supports Remote | Whether the (sub-)technique can be used to execute something on a remote system |
| Defense Bypassed | Whether the (sub-)technique can be used to bypass or evade a particular defensive tool |
| CAPEC ID | Related CAPEC entries |
| Impact Type | If the (sub-)technique can be used for integrity or availability attacks |
| Procedure Example | The group or software entity with a brief description of how the (sub-)technique is used |
| Detection | High level analytic processes, sensors, data, and detection strategies that can be useful to identify a (sub-)technique has been used by an adversary |
| Mitigation | Configurations, tools, or processes that can prevent a (sub-)technique from working or having the desired outcome for an adversary |

The tactic confirmation unit 110 may use only objectively scoring attributes except for attributes (for example, the detection or the mitigation) in which a subjective determination may be involved and attributes (for example, the impact type) having type values that cannot be objectively compared, in the table of Table 2. These attributes can be shown in FIG. 2.

The cyberattack scoring apparatus 100 according to the embodiment of the present disclosure may store the table of FIG. 2 in the storage unit 120 in advance, and the tactic confirmation unit 110 may call the table as needed. On the other hand, a cyberattack scoring apparatus 100 according to another embodiment of the present disclosure may receive the table of FIG. 2 through wired or wireless communication with an external device.

The unit attack score acquisition unit 130 may acquire the score of the unit attack by performing a weighted sum on attributes dependent on the confirmed tactics according to priorities. In this case, the unit attack score acquisition unit 130 may exclude attributes that do not impact on the scoring of each unit attack, for each tactic, by referring to the table of FIG. 2.

Specifically, the unit attack score acquisition unit 130 may exclude the attributes that do not impact on the scoring of each unit attack, for each tactic. For example, as compared with an attack target platform in which the numbers of platforms of the unit attacks belonging to the reconnaissance and resource development are all the same, the values of all platforms are 'PRE', a value of a platform of a unit attack after an initial access tactic is Windows, Linux, or macOS, the unit attack score acquisition unit 130 may decide as in a case in which there is no value of the platform. As a result, the unit attack score acquisition unit 130 may exclude a platform element from a scoring element in the reconnaissance and resource development tactics.

The cyberattack score acquisition unit 140 may sum the acquired scores for unit attacks to acquire the score of the cyberattack.

The cyberattack scoring apparatus 100 according to the embodiment of the present disclosure may be implemented by a computing device including a memory including instructions programmed to perform such functions and a microprocessor that executes these instructions. In this case, each of components of the cyberattack scoring apparatus 100 according to the embodiment of FIG. 1 may be independently implemented by the microprocessor, or at least two of the components may be implemented by one microprocessor.

The configuration of the cyberattack scoring apparatus 100 according to the embodiment of the present disclosure has been described so far. Hereinafter, a cyberattack scoring method performed by the cyberattack scoring apparatus 100 according to the embodiment of the present disclosure will be described.

Figure 3:
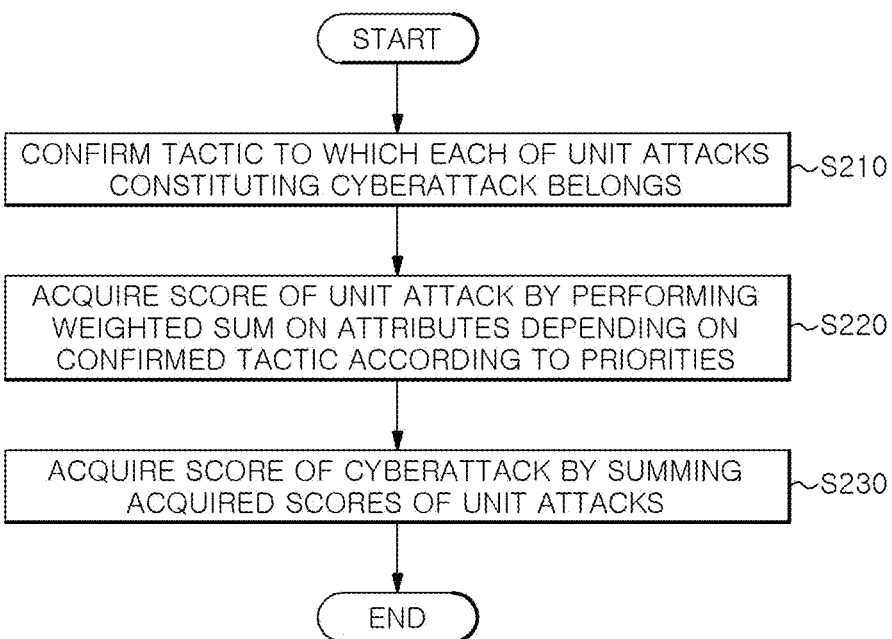
FIG. 3 is a flowchart of a cyberattack scoring method according to an embodiment of the present disclosure.
Figure 4:
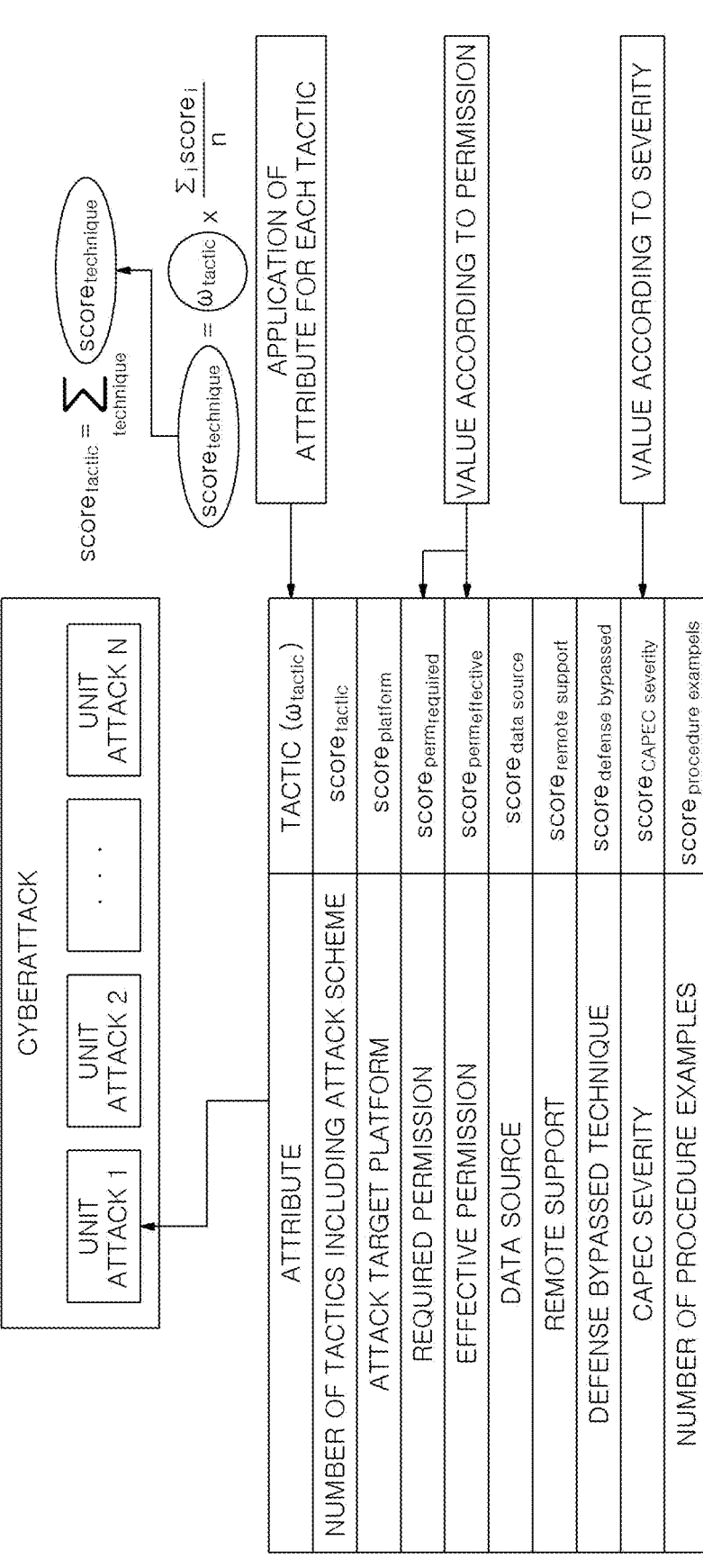
FIG. 4 is a schematic diagram of the cyberattack scoring method according to the embodiment of the present disclosure.

FIG. 3 is a flowchart of a cyberattack scoring method according to an embodiment of the present disclosure, FIG. 4 is a schematic diagram of the cyberattack scoring method according to the embodiment of the present disclosure, FIG. 5 is a diagram illustrating a quantitative value conversion table according to authority used in a method of acquiring a score of a unit attack according to an embodiment in the cyberattack scoring method according to the embodiment of the present disclosure, and FIG. 6 is a diagram illustrating a quantitative value conversion table according to a severity level used in a method of acquiring a score of a unit attack according to an embodiment in a cyberattack scoring method according to another embodiment of the present disclosure.

First, the cyberattack scoring apparatus 100 according to the embodiment of the present disclosure may confirm a tactic to which each of the unit attacks constituting the cyberattack belongs (S210). Specifically, the tactic confirmation unit 110 of the cyberattack scoring apparatus 100 may use the table of FIG. 2 when calculating an attack scheme scoring according to an ATT&CK framework-based tactic stored in advance. In this case, the tactic confirmation unit 110 according to the embodiment of the present disclosure may read the table of FIG. 2 from the storage unit 120 or may receive the table of FIG. 2 from an external device.

Next, the cyberattack scoring apparatus 100 according to the embodiment of the present disclosure may perform a weighted sum on attributes dependent on the confirmed tactics according to priorities (S220). Specifically, the unit attack score acquisition unit 130 of the cyberattack scoring apparatus 100 according to the embodiment of the present disclosure may acquire the score of the unit attack by performing a weighted sum on attributes dependent on the tactic according to priorities.

In this case, the unit attack score acquisition unit 130 may exclude attributes in which a subjective determination may intervene and attributes having type values that cannot be objectively compared, from the table of FIG. 2. Hereinafter, a scoring method for each attribute will be described.

Tactics

The unit attack score acquisition unit 130 may acquire the score of the unit attack based on the number of confirmed tactics belonging to a first interest tactic group determined in advance for each unit attack. In this case, the first interest tactic group may include initial access, execution, persistence, privilege escalation, defense evasion, credential access, discovery, lateral movement, collection, and command and control tactics.

The unit attack score acquisition unit 130 according to the embodiment of the present disclosure may assign a greater value to unit attacks belonging to two or more tactics among unit attacks belonging to the first interest tactic group since such unit attacks can be used for more purposes than unit attacks belonging to one tactic and have a higher degree of utilization (attack usability). In this case, the value can be calculated using Equation 4, and a score can be assigned in a range of 1 to 5 points.

$$\text{score}_{tactic} = 1 + (\text{num}_{tactic} - 1) \qquad \text{Equation 4}$$

Here, $\text{num}_{tactic}$ may mean the number of tactics to which the unit attack belongs. 0 points may be assigned to unit attacks of reconnaissance, resource development, command and control, exfiltration, and impact tactics.

Platform

The unit attack score acquisition unit 130 may acquire the score of the unit attack based on number of attack target platforms of unit attack belonging to a predetermined second interest tactic group. In this case, the second interest tactic group may include initial access, execution, persistence, privilege escalation, defense evasion, credential access, discovery, lateral movement, collection tactic, command and control, exfiltration, and impact.

The unit attack score acquisition unit 130 according to the embodiment of the present disclosure may assign a greater value to unit attacks for several target platforms among unit attacks belonging to the second interest tactic group since the unit attacks have higher degree of utilization than unit attacks for one target platform (attack surface). The unit attack score acquisition unit 130 according to the embodiment of the present disclosure may assign 1 point to one attack target platform and 5 points to two or more attack target platforms. Further, the unit attack score acquisition unit may assign 0 points to unit attacks of the reconnaissance and resource development tactics.

Required Permissions

The unit attack score acquisition unit 130 may acquire the score of the unit attack based on a required permission level among unit attacks belonging to a third interest tactic group determined in advance. In this case, the third interest tactic group may include initial access, execution, persistence, credential access, defense evasion, credential access, discovery, lateral movement, collection, command and control, exfiltration, and impact tactics.

The unit attack score acquisition unit 130 according to the embodiment of the present disclosure may assign the smallest value among values in a list when there is a value for a required permission item in unit techniques belonging to the third interest tactic group. The required permission corresponds to one of the items of FIG. 5, and the unit attack score acquisition unit 130 according to the embodiment of the present disclosure may assign a score to each item in a range of 1 to 5 points, and 0 points can be assigned to unit attacks of the reconnaissance and resource development tactics.

Effective Permissions

The unit attack score acquisition unit 130 may acquire the score of the unit attack based on an effective permission level according to the execution of a unit attack belonging to a fourth interest tactic group defined in advance. In this case, the fourth interest tactic group may include the privilege escalation tactic which is a privilege level that can be obtained by an attacker by performing a specific unit attack.

Since a higher effective permission level means a higher risk of attack, the unit attack score acquisition unit 130 according to the embodiment of the present disclosure may assign a score in a range of 1 to 5 points according to the effective permission of FIG. 5. 0 points may be assigned to unit attacks other than the privilege escalation.

Data Sources

The unit attack score acquisition unit 130 may acquire the score of the unit attack based on a category of data source for the unit attack and the number of data components therein. In this case, the data source means a category and type of data required to detect the unit attacks.

When the number of items of the data source for the specific unit attack is large, the unit attack is highly likely to be detected, and the impact of the attack for the unit attack can be reduced. Therefore, the unit attack score acquisition unit 130 according to the embodiment of the present disclosure can reduce the values of the attack level as follows by decreasing the values of the data source items when the number of data sources is large.

One category of data source and one data component therein: 5 points

One category of data source and two or more data components therein: 3 points

Two or more categories of data sources: 1 point

Remote Supports

The unit attack score acquisition unit 130 may acquire the score of the unit attack based on whether or not remote support is performed among unit attacks belonging to a fifth interest tactic group determined in advance. In this case, the fifth interest tactic group may include an execution tactic indicating whether or not a specific unit attack can be executed in the remote system.

When the unit attack can be executed remotely, this means that the unit attack has a higher risk than other unit attacks, and thus, the unit attack score acquisition unit 130 according to the embodiment of the present disclosure may assign 5 points when the unit attack can be executed remotely, and otherwise assign 1 point. 0 points may be assigned to unit attacks of tactics other than the execution.

Defense Bypassed

The unit attack score acquisition unit 130 may acquire the score of the unit attack based on a target type and the number of defense bypassed schemes of the unit attack belonging to a sixth interest tactic group determined in advance. In this case, the sixth interest tactic group may include the defense evasion and lateral movement tactics.

A unit attack in which a plurality of bypassed schemes is listed is highly likely to be secretly performed, which means that the risk is higher than that of other unit attacks. Accordingly, the unit attack score acquisition unit 130 according to the embodiment of the present disclosure may classify target defense techniques listed in a defense bypassed item into host-based defense techniques and network defense techniques according to Table 3 and perform scoring.

TABLE 3

| Category | Defense techniques |
| --- | --- |
| Host | Anti-Virus |
| | Application Control |
| | Application Control by File Name or Path |
| | Autoruns Analysis |
| | Binary Analysis |
| | Digital Certificate Validation |
| | File Monitoring |
| | File System Access Controls |
| | Heuristic Detection |
| | Host Forensic Analysis |
| | Host Intrusion Prevention Systems |
| | Log Analysis |
| | Notarization; Gatekeeper |
| | Static File Analysis |
| | System Access Controls |
| | User Mode Signature Validation |
| | Windows User Account Control |
| Network | Encryption |
| | Firewall |
| | Router Acl |
| | Network Intrusion Detection System |
| | Signature-based Detection |
| | Web Content Filters |

There is one type of target of defense bypassed schemes, and one defense technique therein: 1 point There is one type of target of defense bypassed technique, and there are two or more defense techniques therein: 3 points There are two or more types of targets of defense bypassed schemes: 5 points The unit attacks belonging to the defense evasion tactic among the unit attacks belonging to some lateral movement tactics, and limited defense bypassed schemes are specified. Therefore, the unit attack score acquisition unit 130 according to the embodiment of the present disclosure may apply the above scoring method to unit attacks belonging to the defense evasion and lateral movement tactics, and assign 0 points to unit attacks belonging to other tactics.

General Severity of Associated CAPEC

The unit attack score acquisition unit 130 may acquire the score of the unit attack based on a typical severity level matching the unit attack. This method may be applied to unit attacks mapped with CAPEC among unit attacks for all tactics.

Among attributes of the CAPEC attack pattern, quantifiable attributes include prerequisites, consequences, a likelihood of an attack, skills required, and typical severity, but the unit attack score acquisition unit 130 uses only the typical severity including some of CAPEC attack patterns and allows confirmation of a level of the attack pattern.

The unit attack score acquisition unit 130 according to the embodiment of the present disclosure may perform scoring according to FIG. 6. Specifically, the unit attack score acquisition unit 130 according to the embodiment of the present disclosure may assign the highest typical severity as a representative value when there are two or more CAPEC attack patterns matching a specific unit attack, and assign 0 points to unit attacks in which there is no matching CAPEC attack pattern when there is a matching CAPEC attack pattern, but a typical severity value thereof is not assigned.

Therefore, 0 points are assigned to unit attacks that do not have a matching CAPEC attack pattern but are generally determined to be with a high severity level, causing a problem that severity is evaluated to be lower than that of unit attacks in which there is a CAPEC attack pattern and a typical severity value thereof is low.

In order to solve this problem, the unit attack score acquisition unit 130 according to the embodiment of the present disclosure may exclude a CAPEC attack pattern attribute from scoring elements of the unit attack when 0 points are assigned to the CAPEC attack pattern attribute. This is a measure of fairness with unit attacks that have a CAPEC attack pattern and are assigned a typical severity value.

Procedure Examples

The unit attack score acquisition unit 130 may acquire the score of the unit attack based on the number of procedure examples included in the tactic to which the unit attack belongs. Here, the procedural example is a collection of examples in which all unit attacks are used by an attack group or software (including malware, and tools for a normal purpose), and published threat intelligences such as threat analysis reports and blog posts are analyzed for each unit attack in ATT&CK.

Statistics of the number of procedure examples listed in the ATT&CK attack technique are shown in Table 4.

TABLE 4

| Minimum | 0 |
|---|---|
| Median | 3 |
| Maximum | 337 |
| Average | 16.5795053 |
| Standard Deviation | 38.8540333 |
| Q1 (Bottom 25%) | 1 |
| Q3 (Top 25%) | 14 |
| IQR (Interquartile range) | 3 |
| Lower Bound (Q1 − 1.5 × IQR) | 0 |
| Upper Bound (Q3 + 1.5 × IQR) | 33.5 |

The unit attack score acquisition unit 130 according to the embodiment of the present disclosure may assign a score in a range of 0 to 5 points according to Equation 5 for the number of procedure examples of the unit technique included in each tactic using the statistics in Table 5.

$$score_{procedure\ examples} = \frac{num - bound_{upper}}{bound_{upper} - bound_{lower}} \times 5 \qquad \text{Equation 5}$$

Here, 'num' may mean the number of procedure examples of the unit technique, and $bound_{upper}$ and $bound_{lower}$ may mean the upper bound and lower bound of Table 7, respectively. The unit attack score acquisition unit 130 according to the embodiment of the present disclosure may regard the number of procedure examples exceeding the upper bound as an outlier and assign 5 points which is a maximum score.

The unit attack score acquisition unit 130 according to the embodiment of the present disclosure may perform a weighted sum on the attributes dependent on the tactic according to the priority while scoring according to the above method. Specifically, the unit attack score acquisition unit 130 according to the embodiment of the present disclosure may assign different priorities and weights according to the urgency and impact of the purpose of each tactic.

Specifically, the unit attack score acquisition unit 130 according to the embodiment of the present disclosure may set a first-rank tactic including exfiltration and impact corresponding to an ultimate goal of the APT attack, as the highest priority.

Next, the unit attack score acquisition unit 130 according to the embodiment of the present disclosure may set a tactic that is not the ultimate goal of the APT attack, but is a very serious threat when performed by an attacker, as a second-rank tactic. In this case, the second rank tactic may include the lateral movement (the attack goal is moved to an asset that is the ultimate goal of the APT attack), credential access (the ultimate goal of the APT attack can be achieved when a system or administrator account is acquired), and collection (the ultimate goal of an APT attack can be achieved when system or administrator account is acquired).

Further, the unit attack score acquisition unit 130 according to the embodiment of the present disclosure may set a third-rank tactic including the persistence and the privilege escalation. This is because the persistence tactic allows an attacker to perform various actions for maintaining control over a victim host and network during an APT attack, and the privilege escalation tactic allows the attacker to perform various actions that can potentially achieve an attack goal through the privilege escalation.

Further, the unit attack score acquisition unit 130 according to the embodiment of the present disclosure may set the reconnaissance and resource development tactics, which are activities before an attacker first infiltrates a victim host or network, as a sixth-rank tactic with the lowest priority. Here, the sixth rank tactic may include the reconnaissance and the resource development. On the other hand, the unit attack score acquisition unit 130 according to the embodiment of the present disclosure may set the initial access tactic in which the attacker first infiltrates the victim host or network, as a fifth-rank tactic.

The execution, defense evasion, discovery, and command and control tactics other than those mentioned above may be set as fourth-rank tactics with a fourth highest priority.

The priorities and weights thereof according to the tactics described above are illustrated in Table 5.

TABLE 5

| Tactic ID | Tactic Name | Priority | Weight |
|---|---|---|---|
| TA0042 | Reconnaissance | 6 | 0.75 |
| TA0043 | Resource Development | 6 | 0.75 |
| TA0001 | Initial access | 5 | 1 |
| TA0002 | Execution | 4 | 1.25 |
| TA0003 | Persistence | 3 | 1.5 |
| TA0004 | Privilege escalation | 3 | 1.5 |
| TA0005 | Defense Evasion | 4 | 1.25 |
| TA0006 | Credential access | 2 | 1.75 |
| TA0007 | Discovery | 4 | 1.25 |
| TA0008 | Lateral movement | 2 | 1.75 |
| TA0009 | Collection | 2 | 1.75 |
| TA0010 | Exfiltration | 1 | 2 |
| TA0011 | Command and Control | 4 | 1.25 |
| TA0040 | Impact | 1 | 2 |

The unit attack score acquisition unit 130 according to the embodiment of the present disclosure may assign respective weights at equal intervals within a range of 1 to 2 from the highest priority to the lowest priority.

The unit attack score acquisition unit 130 according to the embodiment of the present disclosure may acquire the score of the unit attack according to Equation 6 based on such a weight.

$$score_{technique} = w_{tactic} \times \frac{\sum_i score_i}{n} \qquad \text{Equation 6}$$

Here, $\omega_{tactic}$ may mean the weight of a tactic to which the attack technique belongs, i may mean each scoring attribute, and score i may mean a score for each attribute (score in a range of 0 points or 1 to 5 points). Further, n may mean the number of attributes to which scores other than 0 points have been assigned (however, a procedure example element include 0 points) in the number of attributes considered for quantification for each tactic listed in the last column of FIG. 2. For example, since the unit attack in which a non-zero score has been assigned to all other considered attributes, but a value for the typical severity of the CAPEC attack pattern has not been assigned should be excluded from the scoring attributes, the denominator may be n-1 rather than n. The score acquired according to Equation 6 may be distributed in a range of 0 to 5 points.

Finally, the cyberattack scoring apparatus 100 according to the embodiment of the present disclosure may acquire the score of the cyberattack by summing the acquired scores of the unit attacks (S230). Specifically, the cyberattack score acquisition unit 140 of the cyberattack scoring apparatus 100 according to the embodiment of the present disclosure can acquire the score of the entire cyberattack by summing the scores of the unit attacks constituting the entire cyberattack.

Thus, according to an embodiment of the present disclosure, it is possible to easily determine the urgency and/or importance of a cyberattack by scoring and quantifying the cyberattack. This makes it possible to set a coping priority for cyberattacks and appropriately cope with the cyberattacks according to the set priorities.

Meanwhile, respective steps included in the cyberattack scoring method according to the above-described embodiment may be implemented in a computer-readable recording medium in which a computer program programmed to perform these steps is recorded.

Further, the respective steps included in the cyberattack scoring method according to the above-described embodiment may be implemented as a computer program programmed to perform these steps.

The above description is merely an exemplary description of the technical scope of the present disclosure, and it will be understood by those skilled in the art that various changes and modifications can be made without departing from the original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A cyberattack scoring method to be performed by a cyberattack scoring device including a memory storing one or more instructions; and a processor executing the one or more instructions stored in the memory, the method comprising:

determining a tactic for each of unit attacks included in a cyberattack based on an adversarial tactics, techniques, and common knowledge (ATT&CK) framework;

determining a score for each of the unit attacks by calculating a weighted sum on attributes depending on the determined tactic according to priorities; and determining the score of the cyberattack by summing the determined scores of the unit attacks, wherein in determining the score for each unit attack, the score of each unit attack is determined based on a typical severity level of an attack pattern of Common Attack Pattern Enumeration and Classification (CAPEC) which matches each unit attack, and wherein an attribute of the CAPEC attack pattern is excluded from the weighted sum of the attributes when a score of 0 is assigned to the attribute of the CAPEC attack pattern.

2. The cyberattack scoring method of claim 1, wherein determining the score for each of the unit attacks includes determining the score of a unit attack based on the number of determined tactics of the unit attack included in a predetermined first interest tactic group.

3. The cyberattack scoring method of claim 1, wherein determining the score for each of the unit attacks includes determining the score of a unit attack based on the number of attack target platforms of the unit attack included in a predetermined second interest tactic group.

4. The cyberattack scoring method of claim 1, wherein determining the score for each of the unit attacks includes determining the score of a unit attack based on a required permission level of the unit attack included in a predetermined third interest tactic group.

5. The cyberattack scoring method of claim 1, wherein determining the score for each of the unit attacks includes determining the score of a unit attack based on an effective permission level according to execution of the unit attack included in a predetermined fourth interest tactic group.

6. The cyberattack scoring method of claim 1, wherein determining the score for each of the unit attacks includes determining the score of a unit attack based on a type of data sources for the unit attack and the number of data components included in the unit attacks.

7. The cyberattack scoring method of claim 1, wherein determining the score for each of the unit attacks includes determining the score of a unit attack based on whether or not the unit attack included in a predetermined fifth interest tactic group is remotely controlled.

8. The cyberattack scoring method of claim 1, wherein determining the score for each of the unit attacks includes determining the score of a unit attack based on a target type and number of defense bypassed schemes of the unit attack included in a predetermined sixth interest tactic group.

9. The cyberattack scoring method of claim 1, wherein determining the score for each of the unit attacks includes determining the score of a unit attack based on the number of procedure examples of a unit technique included in the unit attack.

10. The cyberattack scoring method of claim 1, wherein determining the score for each of the unit attacks includes determining a weight used for the weighted sum according to the priority including a first-priority tactic including exfiltration and impact, a second-priority tactic including lateral movement, credential access, and collection, a third-priority tactic including persistence and privilege escalation, a fourth-priority tactic including execution, defense evasion, discovery, and command and control, a fifth-priority rank tactic including initial access, and a sixth-priority tactic including reconnaissance and resource development.

11. A cyberattack scoring apparatus comprising:

a memory storing one or more instructions; and a processor configured to execute the one or more instructions to:

determine a tactic for each of unit attacks included in the cyberattack based on an adversarial tactics, techniques, and common knowledge (ATT&CK) framework, determine a score for each of the unit attacks by calculating a weighted sum on attributes depending on the determined tactic in order of priority, and determine the score of the cyberattack by summing the determined scores of the unit attacks, wherein in determining the score for each unit attack, the processor is configured to determine the score of each unit attack based on a typical severity level of an attack pattern of Common Attack Pattern Enumeration and Classification (CAPEC) which matches each unit attack, and wherein an attribute of the CAPEC attack pattern is excluded from the weighted sum of the attributes when a score of 0 is assigned to the attribute of the CAPEC attack pattern.

12. The cyberattack scoring apparatus of claim 11, wherein the processor is configured to determine the score of a unit attack based on the number of determined tactics of the unit attack included in a predetermined first interest tactic group.

13. The cyberattack scoring apparatus of claim 11, wherein the processor is configured to determine the score of a unit attack based on the number of attack target platforms of the unit attack included in a predetermined second interest tactic group.

14. The cyberattack scoring apparatus of claim 11, wherein the processor is configured to determine the score of a unit attack based on a required permission level of the unit attack included in a predetermined third interest tactic group.

15. The cyberattack scoring apparatus of claim 11, wherein the processor is configured to determine the score of a unit attack based on an effective permission level according to execution of the unit attack included in a predetermined fourth interest tactic group.

16. The cyberattack scoring apparatus of claim 11, wherein the processor is configured to determine the score of a unit attack based on a type of data sources for the unit attack and the number of data components included in the unit attacks.

17. The cyberattack scoring apparatus of claim 11, wherein the processor is configured to determine the score of a unit attack based on whether or not the unit attack included in a predetermined fifth interest tactic group is remotely controlled.

18. The cyberattack scoring apparatus of claim 11, wherein the processor is configured to determine the score of a unit attack based on a target type and number of defense bypassed schemes of the unit attack included in a predetermined sixth interest tactic group.

19. A non-transitory computer readable storage medium storing computer executable instructions, when executed by a processor, configured to perform the method of claim 1.

\* \* \* \* \*